United States Patent [19]

Morio et al.

[11] 4,268,875
[45] May 19, 1981

[54] AVOIDANCE OF DISTURBANCE OF HORIZONTAL SYNC SIGNALS IN VIDEO SIGNAL REPRODUCED AT OTHER THAN STANDARD TAPE SPEED

[75] Inventors: Minoru Morio; Masahiro Kambara, both of Tokyo; Yukio Kubota, Takaidonishi; Keitaro Yamashita, Tokyo, all of Japan

[73] Assignee: Sony Corporation, Tokyo, Japan

[21] Appl. No.: 31,515

[22] Filed: Apr. 19, 1979

[30] Foreign Application Priority Data

Apr. 19, 1978 [JP] Japan ................................ 53-46114

[51] Int. Cl.³ .............................................. H04N 5/78
[52] U.S. Cl. ........................................ 360/10; 358/8; 360/36; 360/77
[58] Field of Search ................... 358/8; 360/9, 10, 36, 360/37, 11, 77, 78

[56] References Cited

U.S. PATENT DOCUMENTS

| | | | |
|---|---|---|---|
| 3,371,158 | 2/1968 | Tanaka et al. | 360/36 |
| 3,409,736 | 11/1968 | Hurst et al. | 360/36 |
| 3,639,689 | 2/1972 | Doi | 360/36 |
| 4,100,567 | 7/1978 | Yoshinaka | 358/8 |
| 4,143,405 | 3/1979 | Kubota | 360/10 |
| 4,197,564 | 4/1980 | Ravizza | 360/77 |

OTHER PUBLICATIONS

"Schaltbeispiele"–Siemens, 1976/77, pp. 48–51.

*Primary Examiner*—James W. Moffitt
*Assistant Examiner*—Donald McElheny, Jr.
*Attorney, Agent, or Firm*—Lewis H. Eslinger; Alvin Sinderbrand

[57] ABSTRACT

In a recording and reproducing apparatus in which a video signal is recorded by at least one rotary head in successive parallel tracks on a recording medium while the latter is being driven at a predetermined or standard speed in a direction to which said tracks are skewed, and in which the recorded video signal is reproduced by the rotary head repeatedly scanning the recording medium while the latter is selectively driven at the standard speed, as in the normal reproducing mode, or at an arbitrary speed other than such standard speed, for example, at zero speed for the still-motion reproducing mode, or at speeds less than and greater than the standard speed for the slow-motion and quick-motion reproducing modes, respectively; a variable delay circuit is operative during reproducing with the recording medium being driven at an arbitrary speed other than standard speed for variably delaying the video signal reproduced by said rotary head, and a control circuit controls the amounts by which the variable delay circuit delays the reproduced video signal in accordance with the arbitrary speed to cause fields of the reproduced video signal which are contiguous or next adjacent in point of time to be continuous in the delayed video signal and to contain respective horizontal synchronizing signals which are in predetermined phase relationships to each other, that is, precisely in phase or out of phase by one-half horizontal period, as when even- and odd-numbered fields are to be interlaced.

14 Claims, 23 Drawing Figures

AVOIDANCE OF DISTURBANCE OF HORIZONTAL SYNC SIGNALS IN VIDEO SIGNAL REPRODUCED AT OTHER THAN STANDARD TAPE SPEED

BACKGROUND OF THE INVENTION

1. Field of the Invention

This invention relates generally to magnetic recording and reproducing apparatus, such as, video tape recorders of the helical scan type, and more particularly is directed to apparatus of such type capable of improved operation in various reproducing modes, such as, still-motion, slow-motion and quick-motion reproducing modes.

2. Description of the Prior Art

In existing helical scan video tape recorders, the successive parallel tracks in which the video signal is recorded on the magnetic tape are each at a fixed angle to the longitudinal or driven direction of the tape, with such angle being determined by the angle at which the tape is guided about the guide drum having a rotary magnetic head or heads associated therewith, the speed of rotation of such head or heads, and the speed at which the tape is longitudinally driven. If, during reproducing, the speed at which the tape is driven is made to be equal to the standard tape speed for recording, then the scanning path of movement of each rotary head can be made to accurately coincide with a respective one of the record tracks for properly reproducing the video signal recorded therein.

However, if the tape is driven at an arbitrary speed during reproducing, which arbitrary speed is different from the standard speed used for recording, for example, as when the tape is a rest during still-motion reproducing, then the path along which each rotary head repeatedly scans the tape will deviate angularly from the direction along the record tracks. Similarly, when the reproducing operation is carried out with an arbitrary tape speed which is less than, or greater than the standard tape speed for recording, as during slow-motion, or quick-motion reproducing, respectively, the scanning path of each head will deviate angularly from the direction along the tracks. In order to avoid such angular deviation of the head scanning path or locus from the direction along the tracks, it has been proposed to mount each rotary head by means of an electromechanical transducer, for example, a bi-morph leaf, which is effective, in response to an electrical drive signal, to displace the respective rotary head in directions generally transverse to the direction along the tracks, and to apply to the bi-morph leaf a suitable drive signal, for example, having a sawtooth wave component with a period corresponding to the time required for the respective rotary head to scan along each of the tracks, so as to compensate for the previously mentioned angular deviation of the scanning path from the direction along the tracks.

In the case where the tape speed during reproducing is selected to be a fraction of the standard tape speed for recording, so as to establish a slow-motion reproducing mode, each rotary head effects a plurality of scans across the tape in the time required for the tape to move longitudinally a distance equal to the pitch of the successive record tracks. In order to ensure that each head will precisely scan along a record track during each of the repeated scans of the tape during slow-motion reproducing, it has been proposed that the drive signal applied to the bi-morph leaf supporting each head should include the previously mentioned sawtooth wave component and also a component which varies stepwise for the successive scans.

It has also been proposed to effect the recording of the video signal in successive parallel tracks with so-called H-alignment, that is, with the horizontal synchronizing signals, as recorded in adjacent tracks, being located at positions that are aligned with each other in the transverse direction relative to the direction along the tracks, so that interference due to cross-talk between the signals recorded in adjacent tracks is reduced even when the path or locus of a head scanning one of the tracks deviates somewhat from that one track.

Although the above generally-described conventional procedures can reduce or avoid the variations in level of the reproduced video signal that would otherwise be caused by deviation of the scanning path of the head from the record track when reproducing with an arbitrary tape speed other than the standard tape speed for recording, such conventional procedures have not been effective to avoid disturbance of the horizontal synchronizing signals, particularly at the joining parts of fields which are contiguous or mutually adjacent in point of time. By reason of the foregoing, in the image or picture resulting from the reproduced video signal in the still-motion, slow-motion or quick-motion mode, the lateral location at which the final scan of one field is seen to terminate at the bottom of the raster will not correspond with the lateral location at which the initial scan of the next field is seen to commence at the top of the raster. Even if compensating circuits are capable of correcting such lateral deviations between the locations of termination and commencement of the last and first scans of successive fields, the result thereof is a swaying of the image which is visually disturbing.

OBJECTS AND SUMMARY OF THE INVENTION

Accordingly, it is an object of this invention to provide a magnetic recording and reproducing apparatus which avoids the above-described difficulties encountered with the conventional procedures when recording and reproducing a video signal.

More particularly, it is an object of this invention to provide a recording and reproducing apparatus which avoids any disturbance of the horizontal synchronizing signals of a reproduced video signal when the reproducing is effected in a slow-motion, quick-motion or still-motion reproducing mode.

Still another object is to provide a tape recording and reproducing apparatus of the helical-scan type in which disturbance of the horizontal synchronizing signals of a reproduced video signal is avoided even when the reproducing operation is effected with the tape being driven at a speed other than the standard tape speed for recording, whereby a reproduced image of high quality can be obtained from the reproduced video signal.

In accordance with an aspect of this invention, in a recording and reproducing apparatus in which a video signal is recorded by at least one rotary head in successive parallel tracks on a recording medium, such as, a magnetic tape, while the latter is being driven at a standard or predetermined speed in a direction to which the tracks extend at a predetermined angle, and in which the recorded video signal can be reproduced by the rotary head repeatedly scanning the recording medium while the latter is selectively driven at an arbitrary speed ranging from zero speed to at least the standard or predetermined speed; a variable delay means is made operative during reproducing with an arbitrary tape speed other than the standard or predetermined speed for variably delaying the video signal reproduced by the rotary head, and control means controls the amounts by which the variable delay means delays the reproduced video signal in accordance with the arbitrary speed at which the recording medium is driven during reproducing so as to cause fields of the reproduced video signal which are contiguous or mutually adjacent in point of time to be continuous in the delayed video signal and to contain respective horizontal synchronizing signals which are in predetermined phase relationships to each other. Thus, the fields of the reproduced video signal which are next adjacent in point of time will contain respective horizontal synchronizing signals which are precisely in phase with each other, or which are out of phase by one-half horizontal period, as when even- and odd-numbered fields of the reproduced video signal are to be interlaced in the displayed image.

The above, and other objects, features and advantages of the invention, will be apparent in the following detailed description of an illustrative embodiment of the invention which is to be read in connection with the accompanying drawings.

DESCRIPTION OF PREFERRED EMBODIMENT

Before proceding with a detailed description of the present invention, reference will be made to FIG. 1 for its illustration of the rotary head assembly 1 of a helical scan video tape recorder or VTR to which the invention can be advantageously applied. The illustrated rotary head assembly 1 is shown to include a disc 2 which is rotatable in the direction of the arrow A between upper and lower drums 3 and 4 which may be fixed to the chassis or base plate (not shown) of the VTR. An electric motor 5 has its shaft suitably secured to disc 2 for rotatably driving the latter. A magnetic tape 6 constituting the recording medium is wound helically, or at an angle to the plane of rotation of disc 2, about a substantial angular extent, for example, 180°, as shown, of the circumference of drums 3 and 4. Tape 6 is suitably driven, for example, by a cooperating capstan and pressure roller (not shown), so as to move longitudinally in the direction of the arrow B, and the positional relationship of tape 6 to the plane of disc 2 is established by guide posts 7 and 8 at substantially diametrically opposed locations adjacent head assembly 1, and by an inclined guide ramp 9 projecting from the surface of lower drum 4. The rotatable disc 2 carries one or more magnetic head devices 10 (FIG. 3) each constituted by a head chip 11 and a support member 12 by which the head chip 11 is mounted on disc 2 so as to project therefrom slightly beyond the peripheral surfaces of drums 3 and 4 for sliding contact with the surface of magnetic tape 6 in recording and reproducing signals on the latter. In the case of the rotary head assembly 1 of FIG. 1, two diametrically opposed magnetic head devices are provided on disc 2 so that the respective head chips 11a and 11b (of which only the former appears on FIG. 1) will alternately scan obliquely across tape 6.

Figure 1:
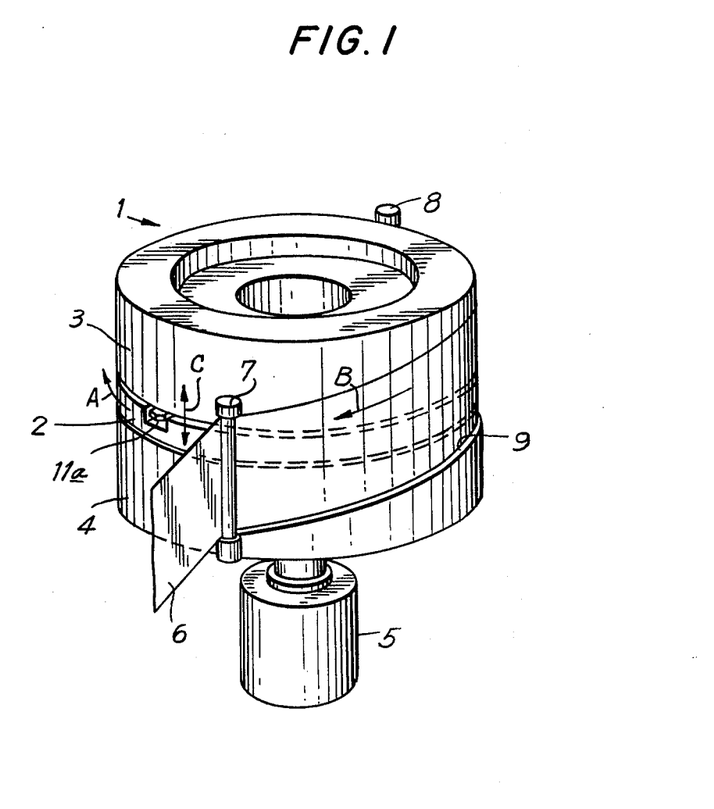
FIG. 1 is a perspective view of a rotating magnetic head assembly of a video tape recorder of the helical-scan type to which the present invention is desirably applicable.
Figure 2:
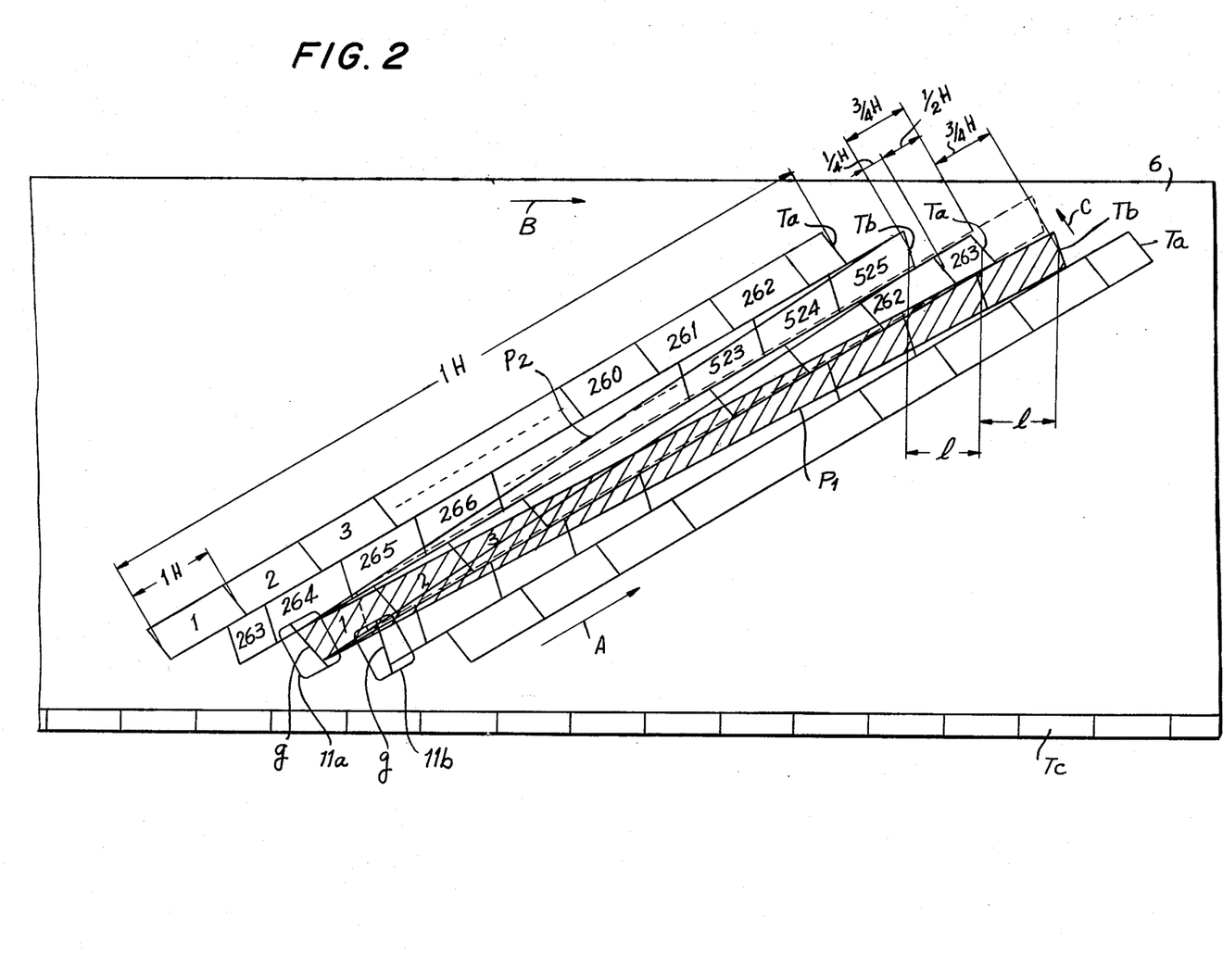
FIG. 2 is an enlarged diagrammatic view of a length of magnetic tape on which a number of record tracks are illustrated, and to which reference will be made in explaining problems to be overcome by the present invention.

Referring now to FIG. 2, it will be seen that, when the tape 6 is continuously advanced or driven in the direction of the arrow B at a standard or predetermined speed for recording and the disc 2 of FIG. 1 is rotated to cause the head chips 11a and 11b to alternately scan obliquely across the tape in the direction of the arrow A, then such head chips 11a and 11b alternately record a video signal in alternately arranged record tracks $T_a$ and $T_b$, respectively, which are skewed or arranged at a predetermined angle in respect to the longitudinal direction of tape 6. In the example shown on FIG. 2, head chips 11a and 11b have gaps g with different azimuth angles, and the standard tape speed for recording is selected so that the adjacent record tracks $T_a$ and $T_b$ will abut along their longitudinal margins, that is, guard bands between the tracks are eliminated, for achieving a high density of recording of the video signals on the magnetic tape. In the case of the recording of an NTSC video signal comprised of 30 frames per second, the illustrated head assembly 1 having two diametrically opposed head chips 11a and 11b mounted on its disc 2 may conventionally have such disc rotated at the speed of 30 revolutions per second so that each of the head chips 11a and 11b will record a field of video signal information while scanning across tape 6 in the recording operation. In other words, odd-numbered fields of the video signal may be recorded in the tracks $T_a$ recorded by head chip 11a having its gap at an azimuth angle slanting toward the left with respect to the direction across the respective track, while even-numbered fields of the video signal are recorded in the tracks $T_b$ recorded by head chip 11b having its gap provided at an azimuth angle slanting toward the right.

The standard tape speed for recording may be selected in relation to the diametrical size of drums 3 and 4 so that, as shown, the positions of the horizontal synchronizing signals of the video signal, as recorded in the next adjacent tracks $T_a$ and $T_b$, are displaced from each other in the direction along the tracks by $\frac{3}{4}$ of a horizontal period (H), that is, $\frac{3}{4}$ of the distance along the track moved by the head chip 11a or 11b during a horizontal period H. Further, as is conventional in the recording of a NTSC video signal, the field recorded in each of the tracks $T_a$ and $T_b$ includes 262 $\frac{1}{2}$ lines or horizontal periods of video information. In other words, the odd-numbered field recorded in each track $T_a$ includes the video signal information for lines or horizontal periods (1) through (262) and $\frac{1}{2}$ of line (263), while the even-numbered field recorded in each track $T_b$ commences with the last half of line (263) and further contains lines (264) through (525). In order that two halves of the 263rd horizontal period or line will be recorded in the odd- and even-numbered fields, respectively, the two adjacent tracks $T_a$ and $T_b$ are, at their lower ends, displaced longitudinally by a distance equivalent to $\frac{3}{4}$ H, as is apparent on FIG. 2. Furthermore, as shown on FIG. 2, control signals are desirably recorded in a track $T_c$ extending along one longitudinal edge of tape 6, with such control signals being at locations which are in a predetermined relationship to the record tracks $T_a$ and $T_b$.

In the case where the reproducing operation of a recording and reproducing apparatus is effected with the tape 6 being driven at the standard speed employed for recording, the paths along which the head chips 11a and 11b alternately scan across tape 6 will be parallel to record tracks $T_a$ and $T_b$ so that a suitable conventional servo system can control the rotary movements of head chips 11a and 11b and/or the instantaneous speed at which the tape is driven for ensuring that each of the head chips 11a and 11b will accurately scan a track $T_a$ or $T_b$, respectively, for reproducing the video signal recorded therein without substantial distortion.

However, if the recorded video signal is reproduced with the tape being driven at a speed different from the standard tape speed $V_o$ for recording, the path or locus along which each of the head chips 11a and 11b scans the tape 6 no longer coincides with a record track and, more particularly, there is an angular deviation of the scanning path from the direction of the record track. For example, on FIG. 2, the shaded area $P_1$ represents the scanning path of head chip 11a when the magnetic tape 6 is stationary or at rest for reproducing the recorded video signal in the still-motion mode. Although the scanning path $P_1$ is shown to initiate at the initial point or commencement of a record track $T_a$, such scanning path $P_1$ is shown to terminate on the adjacent record track $T_b$ which is next to the scanned track $T_a$ in the direction B in which the tape is advanced during recording and normal reproducing. The foregoing results from the fact that, during recording with the tape being driven at the speed $V_o$, the tape travels a distance l in the direction of the arrow B while one or the other of the head chips 11a and 11b records a field of video information in a respective record track, that is, while disc 2 is turned through 180° in the illustrated case of the disc 2 having two magnetic heads thereon. However, during reproducing in the still motion mode with the magnetic tape at rest, the terminating end or position of the scanning path is displaced by the distance l in the direction of the arrow B.

Similarly, during reproducing in the slow-motion mode in which the tape speed is 1/n of the standard tape $V_o$ speed for recording, the terminating position or end of the scanning path is displaced by the distance l−l/n in the direction of the arrow B. On the other hand, when the reproducing in the quick-motion mode with the tape speed then being m times the standard speed for recording, the terminating end of the scanning path is then displaced by (m−1) l in the direction opposite to the arrow B. For example, the scanning path for a quick-motion reproducing mode in which the tape is moved in the direction of the arrow B at twice the standard tape speed for recording, is indicated at $P_2$ on FIG. 2, and it will be seen that the terminating end of the scanning path $P_2$ is shifted or displaced by the distance l in the direction opposite to the arrow B.

Because of the above described misalignment or lack of coincidence between the scanning path of each head and a respective record track on the tape, defects are apparent in the reproduced video signal and the quality of the reproduced image is deteriorated.

Figure 3:
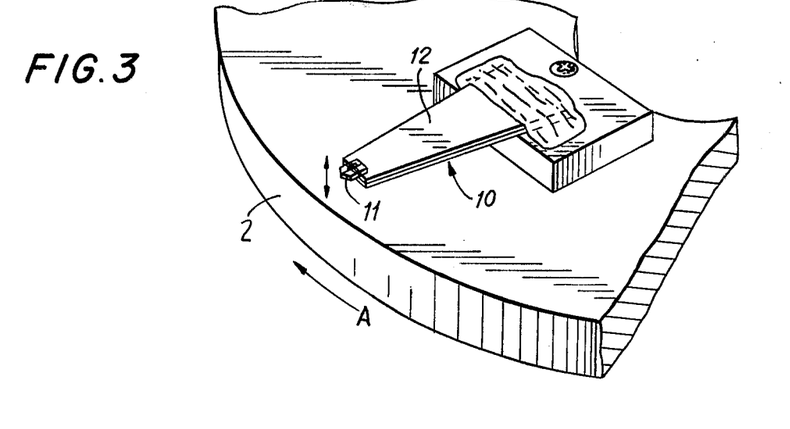
FIG. 3 is an enlarged, fragmentary perspective view illustrating a support structure by which each of the rotary heads of the assembly shown on FIG. 1 is preferably mounted.

In an attempt to avoid the foregoing problems, it has been proposed to form the support member 12 which mounts each of the head chips 11a and 11b on the rotary disc 2 as an electro-mechanical transducer, for example, a bi-morph plate, deflectable in the direction perpendicular to the plane of rotation of disc 2, as indicated by the double-headed arrow C on FIG. 3, thereby to shift the respective head chip, and hence its scanning path, substantially transversely relative to the direction along the record track. Thus, by applying a suitable drive signal to the bi-morph leaf 12 to progressively deflect the rotary head chip in the direction of the arrow C on FIG. 2 as the head chip moves along its scanning path, such scanning path can be displaced from the shaded area indicated at $P_1$ to the position represented by broken lines and in which the center line of the scanning path coincides with the center line of a record track $T_a$. Although the foregoing is effective to minimize the variation in level of the reproduced video signal that would otherwise result from angular deviation of the scanning path of the magnetic head from the direction along the record track, such procedure has not been effective to avoid disturbance of the horizontal synchronizing signals, particularly at the joining parts of fields which are contiguous or mutually adjacent in point of time. In understanding the foregoing, it should be appreciated that the time required for movement of the head chip 11a or 11b along its scanning path corresponds to a vertical period V of the recorded video signal, and is determined by the rotating speed of the magnetic head chip. In the case where the disc 2 has two magnetic head chips 11a and 11b thereon, as shown, the rotational speed of disc 2 is 30 revolutions per second, as previously noted, so that each of the head chips will traverse its scanning path in 1/60 second, that is, in one vertical period V of a NTSC video signal. In the recording mode, 262.5 horizontal lines of video information are recorded in each of the tracks $T_a$, $T_b$ in each vertical period V of 1/60 second. In the normal reproducing mode, that is, reproducing with the tape being driven at the standard speed for recording, 262.5 horizontal lines of reproduced video information are likewise obtained in one vertical period V. However, in the still-motion reproducing mode, even though a drive signal is applied to the bi-morph leaf 12 to deflect the scanning path of the head chip 11a or 11b from the path shown by shading at P₁ to the path represented in broken lines on FIG. 2, 263.25 horizontal lines of video information are delivered within one vertical period V. By reason of the foregoing, in the picture or image that is displayed as a result of the reproduced video signal, the last or bottom line of one field or raster is located laterally beyond the mid-point of the horizontal width of the screen by about ¼ of such width and, in the next or following field, the first or upper scan starts at a location which is only about ¼ of the horizontal width from the side of the screen. Even if compensating circuits are provided to correct such lateral deviations between the locations at which the last and first scans of successive fields terminate and commence, respectively, the result thereof is a swaying of the displayed image which is visually disturbing.

Generally, in accordance with the present invention, the foregoing problems are eliminated in a recording and reproducing apparatus or VTR of the described type by providing the same with variable delay means made operative during reproducing in the slow-motion, quick-motion or still-motion mode, that is, during reproducing with an arbitrary tape speed other than the standard speed for recording, and by which the video signal reproduced by the rotary head or heads is variably delayed, and with control means controlling the amounts by which the variable delay means delays the reproduced video signal in accordance with the arbitrary speed at wich the recording medium is driven during reproducing so as to cause fields of the reproduced video signal which are contiguous or mutually adjacent in point of time to be continuous in the delayed video signal and to contain respective horizontal synchronizing signals which are in predetermined phase relationship to each other.

Figure 4A:
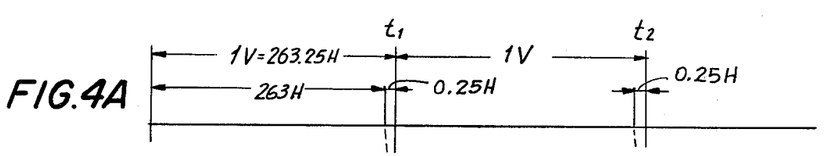
FIGS. 4A–4E and FIGS. 5A–5C are time charts or diagrams to which reference will be made in explaining the processing of a reproduced video signal in an apparatus according to this invention during operation of the latter in its still-motion reproducing mode.
Figure 4B:
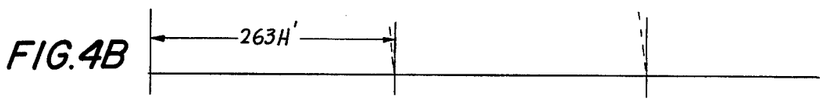

More particularly, in the case of the still-motion reproducing mode of a VTR according to this invention, the reproduced video signal obtained from, for example, the head chip 11a, when the latter is deflected from the shaded path P₁ to the path indicated in broken lines so as to coincide with a record track $T_a$, contains 263.25 horizontal lines of video information in one field or vertical scanning period V of 1/60 seconds, and, in accordance with this invention, such reproduced video signal is processed so that there will be 263, or 263±0.5 in the case of interlacing, horizontal line periods in such vertical scanning period V. If, for example, the reproduced video signal is to be processed in accordance with this invention so as to have 263 horizontal line periods H in each vertical scanning period V, then the reproduced video signal having 263.25 H in the vertical scanning period V measured from the time $t_0$ to the time $t_1$, as shown on FIG. 4A, is elongated along its time axis by an amount 0.25H for each vertical scanning period V so as to obtain the signal of FIG. 4B containing 363H' in the period or interval V from $t_0$ to $t_1$.

Figure 4C:
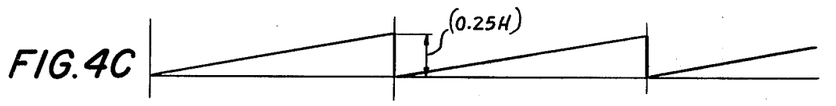

Such elongation may be effected by a variable delay element providing an amount of delay which is gradually or linearly increased during each vertical period V, as shown on FIG. 4C in which the ordinate represents the amount of delay. As shown on FIG. 4C, the variations of the amount of delay is represented by a straight line which indicates 0 delay at the commencement time $t_0$ of a field and a delay of 0.25H at the time $t_1$ when the same vertical field terminates. The variable delay element may be constituted by a charge transfer device (CTD), and among those transfer devices which may be formed as semiconductor elements are charge couple devices (CCD) and bucket brigade devices (BBD). Such charge coupled and bucket brigade devices are operable by a clock signal or pulses with the delay time $T_D$ being dependent upon the number N of steps in the device and the clock signal frequency $f_c$, as below:

$$T_D = N/f_c \qquad (1)$$

As will be apparent from equation (1) above, if the delay time $T_D$ is to be 0, for example, as at the initiating time $t_0$ on FIG. 4C, then the clock frequency $f_c$ must be infinitely great, which is not possible. Accordingly, as shown on FIG. 4D, the initial delay time imparted to the reproduced video signal at the time $t_0$, that is, at the commencement of a vertical period or field V, is a finite value $T_0$, and the variable delay indicated on FIG. 4C is superposed on such initial delay time. Assuming a proportional constant of K for the delay time at a time t, then the delay time $T_D$ from the time $t_0$, at the commencement of a vertical period V, to the time $t_1$, at the end of such vertical period, can be expressed as:

$$T_D(t) = N/f(t) = T_0 + Kt \qquad (2)$$

Alternatively, the clock frequency at the time t can be expressed as:

$$f(t) = N/(T_0 + Kt) \qquad (3)$$

Figure 4D:
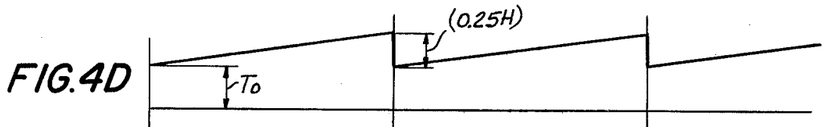
Figure 4E:
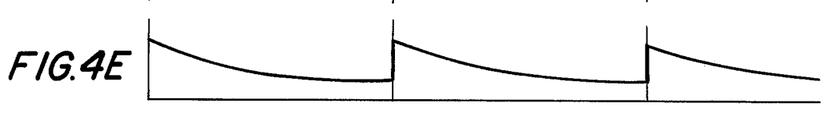

The above equation (3) represents a hyperbolic curve, as shown on FIG. 4E, and the curves of equations (2) and (3) are repeated for successive fields or vertical periods V, thereby resulting in the sawtooth time charts shown on FIGS. 4D and 4E, respectively. The initial delay time $T_0$ is determined with respect to the lowest frequency of the reproduced video signal that has to be delayed. More particularly, the initial delay time $T_0$ is selected so that the lowest clock frequency which produces such initial delay time in the charge couple device (CCD) is at least higher than the lowest frequency of the reproduced video signal. Thus, for example, the initial delay time $T_0$ may be approximately 2H.

Since the field comprised of 263.25 horizontal or line periods H has the latter progressively elongated by the delaying action so as to provide a delayed field of 263H', that is, an integral number of delayed or altered horizontal or line periods, any to fields of the delayed video signal which are contiguous or next adjacent each other in point of time are joined continuously and contain respective horizontal synchronizing signals with no phase difference therebetween. Thus, any discontinuity or phase difference between the horizontal synchronizing signals in successive fields is eliminated to avoid the jitter that otherwise might appear in the displayed image or picture. Such continuous joining of two next adjacent fields with no phase difference between their respective horizontal synchronizing signals means that there will be no phase variation of the horizontal synchronizing signals when transferring from one field to the next field. Therefore, when the successive fields of video signal information are displayed, the horizontal scanning of the displayed image always starts at a predetermined position, for example, at the upper left-hand corner of the screen or image surface.

The above generally referred to delay of the reproduced video signal will now be described in greater detail with reference to FIGS. 5A-5C. More particularly, on FIG. 5A, the reproduced video signal obtained from the head chip 11a or 11b during a field or vertical period V is shown to include horizontal synchronizing pulses or signals $h_0$, $h_1$, $h_2$ - - - $h_{263}$. The reproduced video signal comprised of 263.25 horizontal or line periods H and including the horizontal synchronizing pulses $h_0$ - - - $h_{263}$ is subjected to a progressive delaying process which effects progressive elongation of each horizontal or line period in the direction of the time axis to achieve an aggregate delay of 0.25H at the end of the field or vertical period V. If it is assumed that the initial delay time $T_0$ is 2H and that the final delay time at the end of a field or vertical period V is 2.25H, as shown on FIG. 5C, then, in the delayed video signal shown on FIG. 5B, 263 modified or elongated horizontal or line periods H' will occur in the field or vertical period V extending from the time $t'_0$ to $t'_1$. It will be appreciated that each altered or modified horizontal or line period H' of the delayed video signal in FIG. 5B will be equal to 263.25/263 times each horizontal or line period H in the reproduced video signal of FIG. 5A.

Figures 5A, 5B:
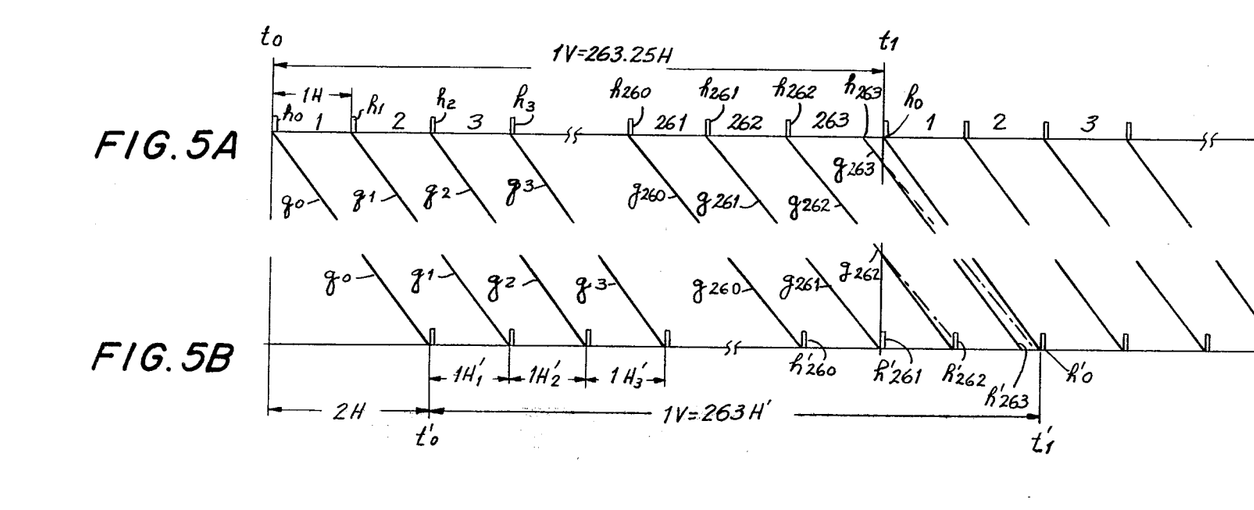

In FIG. 5B, the horizontal synchronizing pulses after elongation or delaying of the video signal are represented at $h'_0$, $h'_1$, $h'_2$, - - - $h'_{263}$. Since the amounts by which the horizontal synchronizing signals are delayed are abruptly varied at the transition point from one field to the next, for example, at the time $t_1$, as shown on FIG. 5C, the delaying of the synchronizing signals can be thought of as proceeding as follows:

Assuming for the sake of explanation that the ordinate between the time charts of FIGS. 5A and 5B correspond to the length of a delay element, such as, a charge coupled device CCD, and that the transmission of the horizontal cynchronizing pulses in such delay element is represented diagrammatically by the lines $g_0$, $g_1$, $g_2$, - - - $g_{262}$ extending between the two time charts, then it will be seen that the spacing between the lines $g_0$ - - - $g_{263}$ on time chart FIG. 5A represents the intervals between the successive horizontal synchronizing pulses or signals at the input end of the delay device, while the spacing between the lines $g_0$ - - - $g_{263}$ on the time chart of FIG. 5B represents the intervals between the successive horizontal synchronizing pulses at the output end of the delay element. As indicated on FIG. 5C, the amount of delay of the horizontal synchronizing signals is varied from 2H to 2.25H in a linear manner starting from the initiation of each field or vertical period, with the inclinations of the successive lines $g_0$, $g_1$, $g_2$ - - - from the horizontal being progressively reduced. However, at the instant or time $t_1$, that is, at the termination of the field or vertical period, the amount by which the signals are delayed is abruptly reduced from 2.25H to 2H, as described above so that the lines $g_{262}$ and $g_{263}$ are deflected at the time $t_1$ from the directions shown in dot-dash lines to those shown in full lines. In other words, the lines $g_{262}$ and $g_{263}$ are deflected at the time $t_1$ so as to thereafter have increased angles of inclination with respect to the horizontal. Accordingly, the intervals between the horizontal synchronizing pulses $h'_{261}$, $h'_{262}$ and $h'_{263}$ which occur between the time $t_1$ and the time $t'_1$, the latter being 2H later than the time $t_1$, are reduced to values less than the values of the intervals $H'_1$, $H'_2$, $H'_3$, - - - occurring between the horizontal synchronizing pulses of the delayed video signal prior to the time $t_1$. The reduction in the intervals between the horizontal synchronizing pulses $h'_{261}$, $h'_{262}$, and $h'_{263}$ occurring after the time $t'$ can be compensated by the usual AFC circuit of a VTR. However, if desired, and as later described herein in detail, the horizontal synchronizing signals contained in the delayed video signal from the time $t_1$ to the time $t'_1$ on FIG. 5B may be removed and replaced by simulated or synthesized horizontal synchronizing signals having intervals therebetween equivalent to the intervals between the horizontal synchronizing signals in the delayed video signal immediately prior to the time $t_1$.

In the case where an odd-numbered field and an even-numbered field of the video signal are to be interlaced when displayed on a viewing screen, the predetermined phase relationship to be maintained between the horizontal synchronizing signals in the fields of the delayed video signal which are contiguous in point of time is a phase difference of 0.5H. In other words, for interlacing purposes, the horizontal synchronizing signals in one field of the delayed video signal are made to be out of phase, by onehalf horizontal or line period, in respect to the horizontal synchronizing signals contained in the next adjacent field, in point of time. In order to achieve the foregoing, the delay shown on FIG. 5C to vary linearly from a delay of 2H at the commencement of each field to a delay of 2.25H at the end of each field, may be superposed on a rectangular wave component (not shown) which, in alternating fields, for example, in the odd-numbered fields, imposes a further continuous delay of 0.5H.

The application of the present invention to the quick-motion reproducing mode of a VTR will now be described with reference to FIGS. 6A-6E in which it is assumed that the tape speed during quick-motion reproduction is twice the standard tape speed for recording and for normal reproduction. As is apparent from the scanning path $P_2$ on FIG. 2 and as shown on FIG. 6A, in such quick-motion reproducing mode, the reproduced video signal contains, in each field or vertical period V, 261.75 horizontal or line periods, that is, 262.5H−0.75H. In accordance with the present invention, such reproduced video signal is compressed in the direction of the time axis by an aggregate of 0.25H for each field or vertical period so as to obtain 262H' (in which H' is a modified or altered horizontal period) in each field or vertical period V, as shown on FIG. 6B. The foregoing is obtained by linearly compressing the horizontal periods of the reproduced video signal by an aggregate or total of 0.25H for each vertical period or field V, as shown on FIG. 6C. Assuming again the the least delay time possible with the CCD or other charge transfer device is 2H, then the CCD will be suitably controlled to provide a delay time of 2.25H at the commencement of each field, for example, at the time $t_0$, and a delay time of 2H at the termination of each field, for example, at the time $t_1$, as shown on FIG. 6D. Such variation of the delay time is repeated for the successive fields so as to form a sawtooth component of delay. A CCD may be controlled for providing a varying delay illustrated on FIG. 6D by means of a clock signal having its frequency varied as shown on FIG. 6E.

Figure 5C:
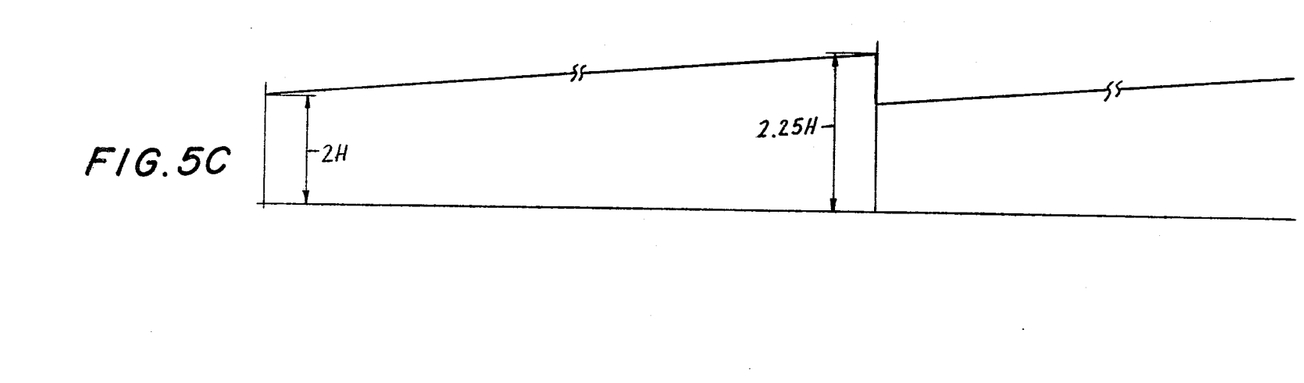
Figure 6A:
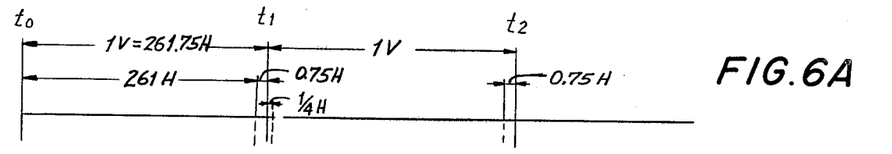
FIGS. 6A–6E and 7A–7C are time charts similar to those of FIGS. 4A–4E and FIGS. 5A–5C, respectively, but which apply to operation of the apparatus in the quick-motion reproducing mode.
Figure 6B:
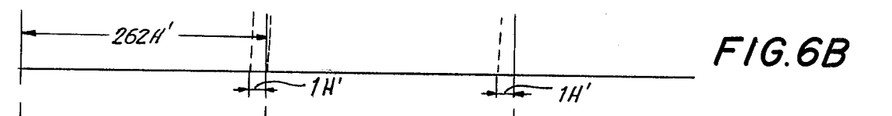
Figure 6C:
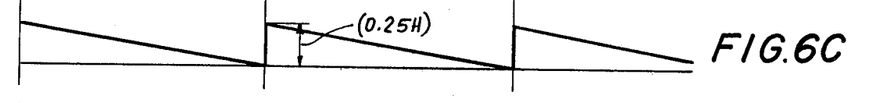
Figure 6D:
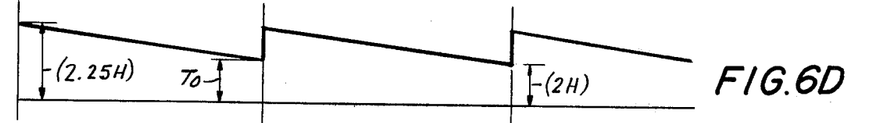
Figure 6E:
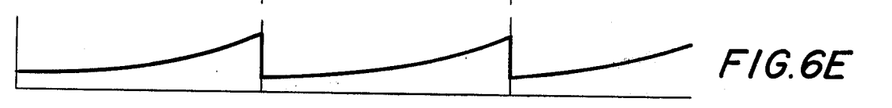
Figure 7A:
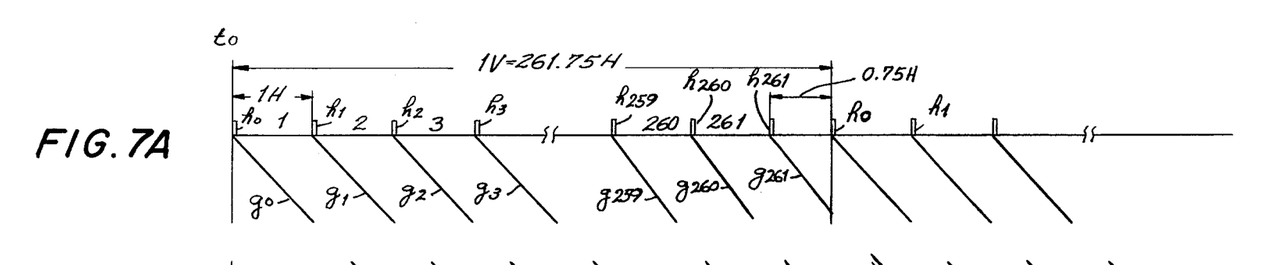
Figure 7B:
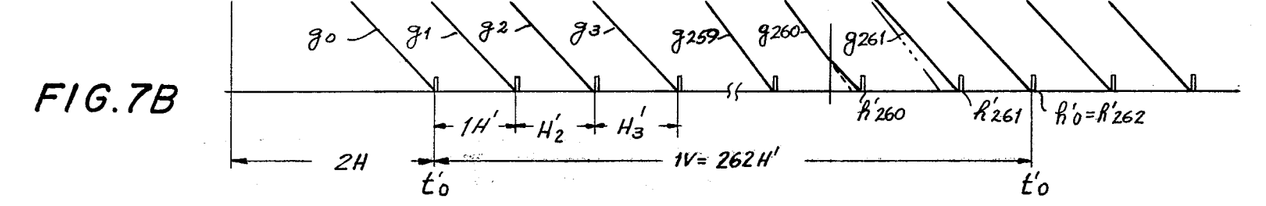
Figure 7C:
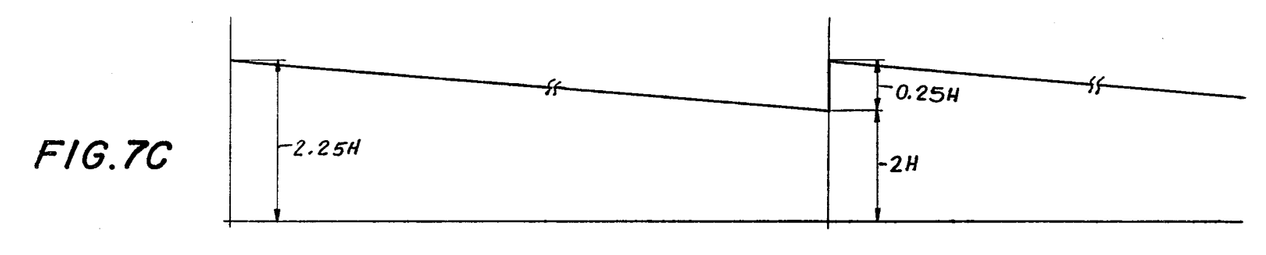

FIGS. 7A, 7B and 7C will be seen to generally correspond to FIGS. 5A, 5B and 5C, respectively, but apply to the quick-motion reproducing mode of the VTR in which the tape speed is twice the standard tape speed for recording. However, in the case of FIGS. 7A and 7B, it will be seen that the inclinations of the lines $g_0$, $g_1$, $g_2$ - - - extending therebetween are progressivly increased until, at the time $t_1$, the delay time is abruptly increased from 2H to 2.25H. Thus, the lines $g_{260}$ and $g_{261}$ are bent at the time $t_1$ and thereafter the inclinations of such lines are reduced.

The application of the present invention to the slow-motion reproducing mode of a VTR will now be described with reference to FIG. 8 from which it will be apparent that, in the slow-motion reproducing mode, it is necessary to provide compensation at the commencement of the scanning of a record track, as well as at the termination of such scanning, as previously described with reference to the still-motion and quick-motion reproducing modes. As will be apparent from FIG. 8, in the slow-motion reproducing mode, the points at which a magnetic head or head chip initiates scanning of a record track for providing successive fields of the reproduced video signal are displaced in the direction of time, that is, in the scanning direction. In a slow-motion reproducing mode with the tape being driven at 1/n the standard tape speed for recording or normal reproduction, the scanning is initiated from the starting or lower end of a record track, as viewed on FIG. 8, after every n frames of the slow-motion reproduction. In the case of a VTR having a rotatable disc carrying two magnetic heads with the same azimuth angles, either one of the diametrically opposed heads can reproduce the video signal recorded in each of the record tracks $T_a$ and $T_b$ and, therefore, in that case, tracking can be initiated again from the starting end of a record track after every n fields of the slow-motion reproduction.

Figure 8:
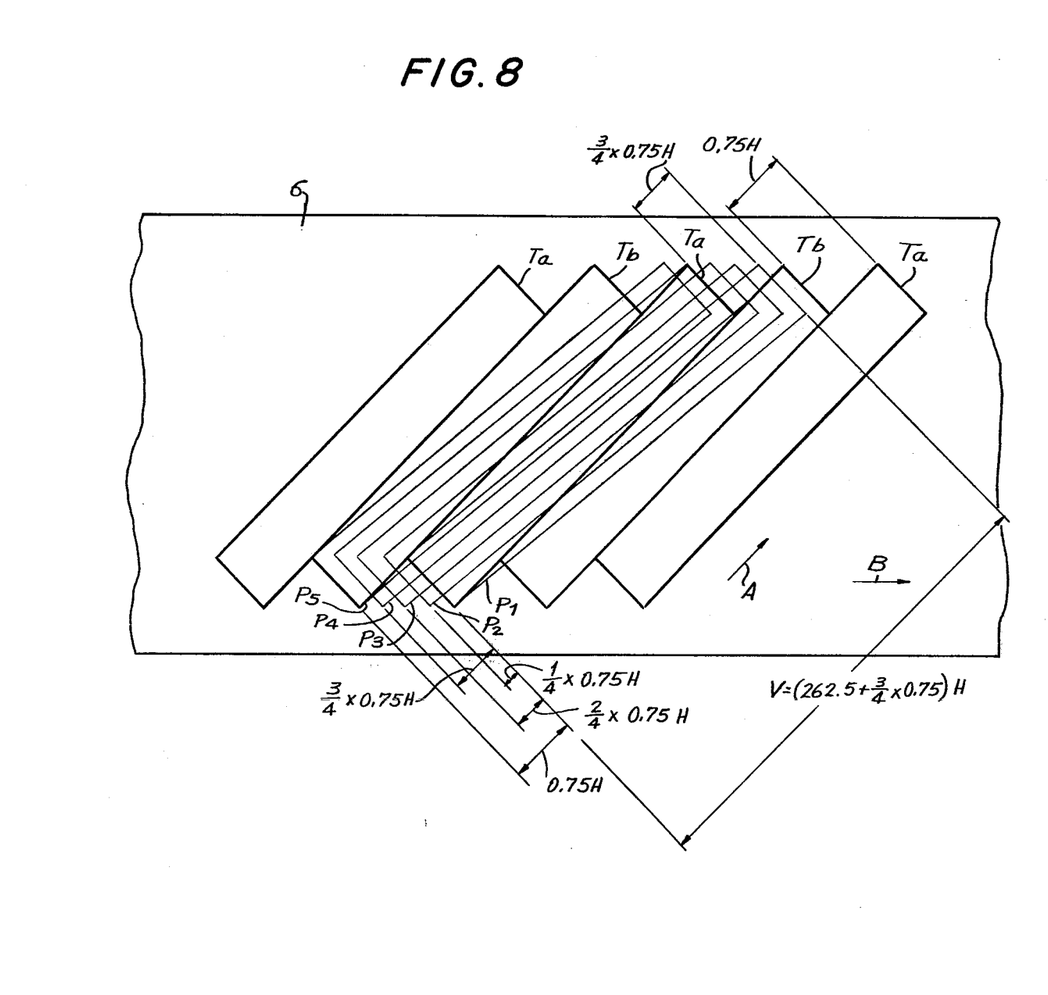
FIG. 8 is an enlarged diagrammatic view of a length of magnetic tape having record tracks shown thereon, and to which reference will be made in explaining the processing of the reproduced video signal during operation of an apparatus according to the invention in the slow-motion reproducing mode.

For the sake of simplicity, FIG. 8 illustrates such an arrangement having two magnetic heads with the same azimuth angles, and with the tape speed being ¼ the standard tape speed for recording or normal reproducing. As shown, when the scanning path $P_1$ of the first magnetic head or slow-motion reproducing of a field of the video signal recorded in a record track $T_a$ is initiated at the starting end of such record track $T_a$, the scanning path $P_2$ of the second magnetic head for reproducing the next field in the slow-motion reproduction is initiated at a point spaced from the initiation of the first scanning path $P_1$ in the direction opposed to the arrow A by a distance which is equivalent, in time to ¼×0.75H. Thereafter, the first magnetic head moves in a third scanning path $P_3$ which is initiated at a position delayed, in time, from the initiation of the first scanning path $P_1$ by 2/4×0.75H, and then the second magnetic head moves in a fourth scanning path $P_4$ which is initiated at a position delayed, in time, from the initiation of the first scanning path $P_1$ by ¾×0.75H. Since the tape speed for the example of the slow-motion reproducing mode illustrated on FIG. 8 is ¼ the standard tape speed for recording, the next scanning path $P_5$ is initiated by the first magnetic head at the starting end of the next record track $T_b$. Although the successive scanning paths $P_1$-$P_4$ are shown to be misaligned with respect to the track $T_a$ in the lateral direction of such record track, suitable drive signals may be applied to bi-morph leaves supporting the magnetic heads or head chips, as on FIG. 3, so as to ensure that the two magnetic heads, when alternately scanning record track $T_a$ along the paths $P_1$ and $P_3$ and the paths $P_2$ and $P_4$, respectively, will be accurately aligned with the record track in the lateral direction thereof.

Figure 9:
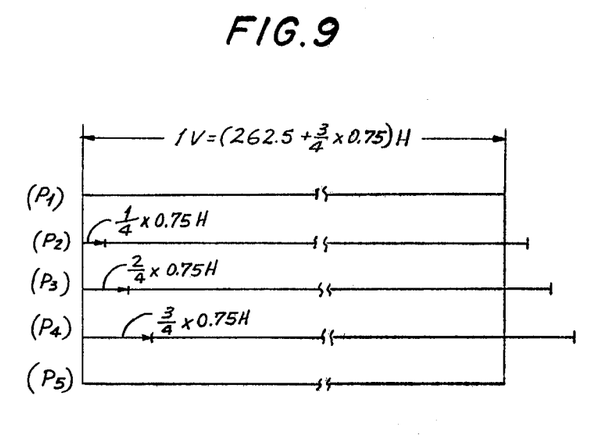
FIG. 9 is a diagrammatic view illustrating the relation between successive fields of a reproduced video signal during operation of the apparatus in its slow-motion reproducing mode.
Figure 10A:
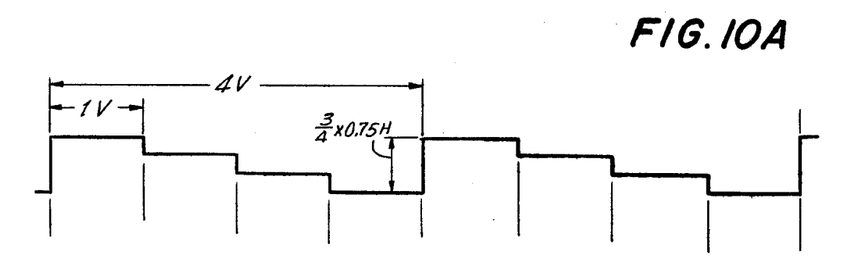
FIGS. 10A and 10B are time charts to which reference will further be made in explaining the processing of the reproduced video signal according to this invention during slow-motion reproduction.
Figure 10B:
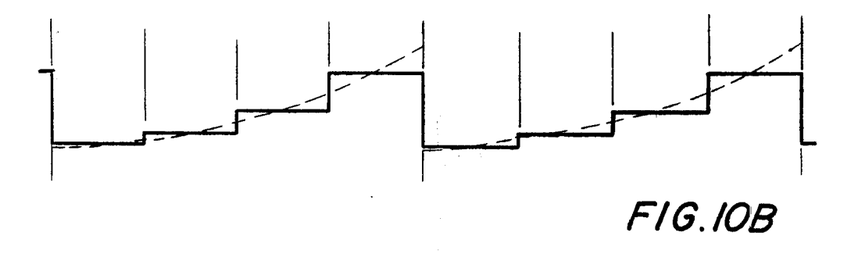

The successive fields of the video signal reproduced in the slow-motion reproducing mode illustrated by FIG. 8 are represented diagramatically on FIG. 9. It will be appreciated from FIG. 9 that, if the successive fields of the reproduced video signal are subjected to the delay times represented on FIG. 10A at the initiations of the successive fields, the previously described successive delays in the initiations of the scanning paths $P_2$, $P_3$ and $P_4$ can be compensated for or eliminated, and undesirable phase displacements of the horizontal synchronizing signals in the successive fields of the reproduced video signal can be avoided. In the case where such delay times are achieved by applying the reproduced video signal to a CCD, FIG. 10 illustrates the changes in clock frequency for controlling the CCD so as to cause the latter to provide the delay times shown on FIG. 10A.

Although the above description of the slow-motion reproducing mode has involved only compensation for the progressive delays in the initiating points of the successive scanning paths, it will be seen from FIG. 8, and also from FIG. 9 that, even in the case of the scanning path $P_1$ which is initiated at the starting end of a record track $T_a$, the video signal reproduced in a vertical period or field V contains (262.5+¾×0.75) horizontal periods H. The video signal reproduced in a field or vertical period V during movement of a head chip or head in any one of the other scanning paths $P_2$-$P_5$ similarly contains (262.5+¾×0.75)H. In order to avoid the discontinuity that would otherwise result at the transition from one field to the next by reason of such departure from the standard 262.5 horizontal or line periods in each field, the compensation previously described in respect to the still-motion reproducing mode is also carried out, in accordance with the present invention, in the case of the slow-motion reproducing mode. In other words, in the case of the slow-motion reproducing mode, compensation is provided for both the initiating and terminating ends of the successive scanning paths.

Figure 11:
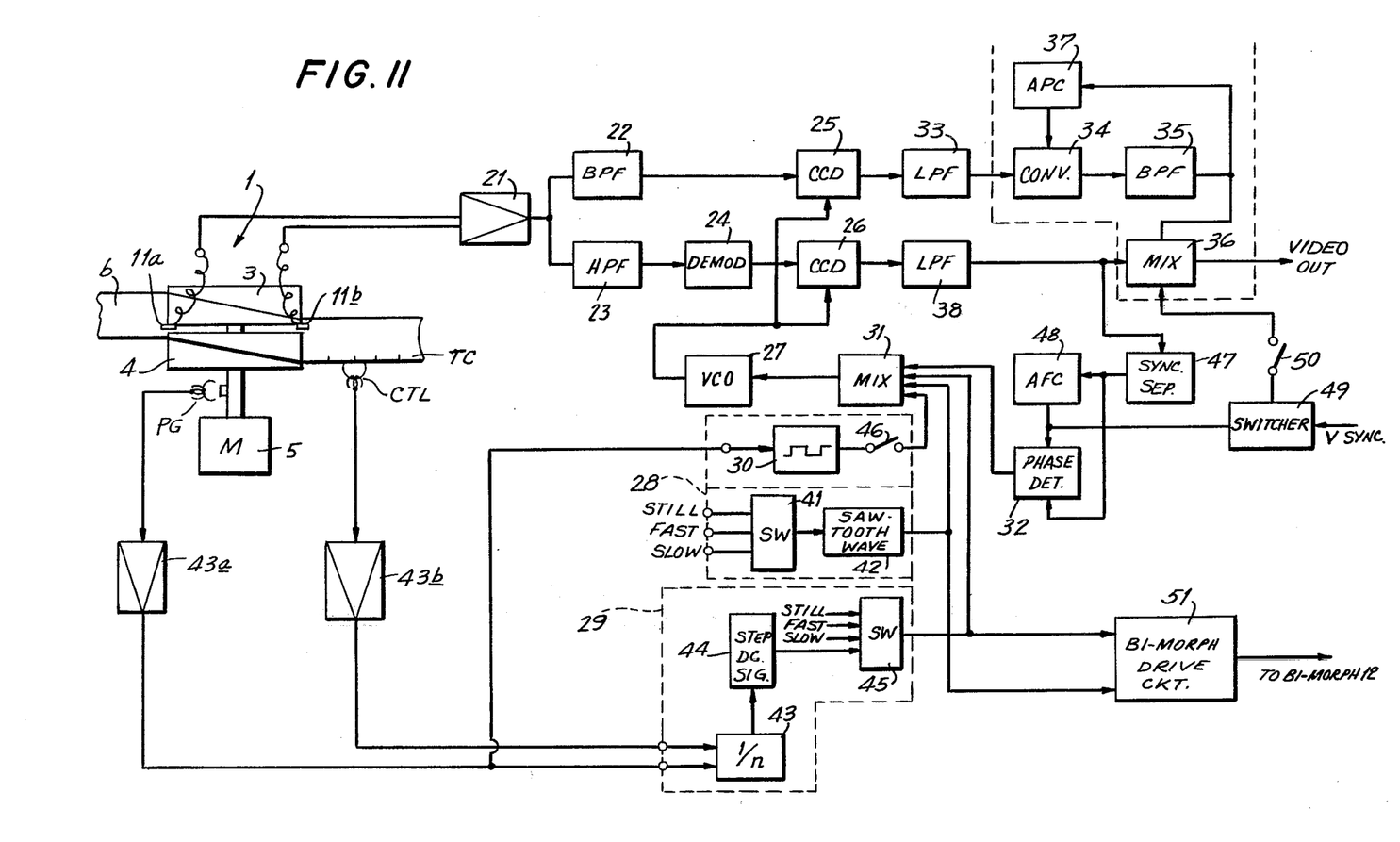
FIG. 11 is a block diagram illustrating the reproducing section of a magnetic recording and reproducing apparatus according to an embodiment of this invention.

Referring now to FIG. 11, it will be seen that, in the reproducing section of a VTR adapted to process a reproduced video signal in accordance with the present invention, as previously described herein, the video signal reproduced by head chip 11a or 11b is passed through a reproducing amplifier 21 to a band-pass filter 22 and a high-pass filter 23 which respectively separate chrominance and luminance components from the reproduced video signal. The luminance component of the reproduced video signal, which is in the form of a frequency modulation of a relatively high frequency carrier, is applied from filter 23 to a frequency demodulator 24 by which there is obtained the relatively low frequency luminance signal. The chrominance component, which has been recorded with its carrier converted to a relatively low frequency, is applied from filter 22 to a variable delay element 25 preferably constituted by a charge coupled device or CCD, while the demodulated luminance signal from demodulator 24 is applied to a variable delay element 26 also preferably in the form of a CCD. The CCD 25 and CCD 26 respectively delay the separated chrominance component and the demodulated luminance signal by amounts that are determined by the frequency of a clock signal issuing from a source 27 which may be in the form of a voltage controlled oscillator or VCO, as shown. The voltage for controlling oscillator 27 is selectively determined by the outputs of a sawtooth wave generating circuit 28, a DC voltage generating circuit 29 and a rectangular wave generating circuit 30 which are selectively applied through a mixer 31 to oscillator 27 as a control voltage for the latter. The voltage controlled oscillator 27 may be further controlled by the output of a phase error detecting circuit 32 which is also applied to oscillator 27 by way of mixer 31, and which stabilizes the frequency of the horizontal synchronizing signals in the video signal obtained at the output of the illustrated reproducing section.

The chrominance component or signal delayed by CCD 25 is applied through a low-pass filter 33 to a frequency converter 34 which has its output applied through a band-pass filter 35 to one input of a mixer or adding circuit 36. The output of filter 35 is also applied to an automatic phase control circuit or APC 37 which provides a frequency converting signal by which frequency converter 34 is operative to return the chrominance carrier to its standard frequency and to correct any phase errors in such carrier signal. The demodulated luminance signal delayed by CCD 26 is applied through a low-pass filter 38 to another input of mixer 36 which, at its output, is adapted to provide the reproduced video signal processed in accordance with the present invention.

In the illustrated embodiment of the invention, sawtooth wave generating circuit 28 is shown to include a switching circuit 41 which is operated in dependence on the selected reproducing mode, that is, the still motion, slow-motion or quick-motion reproducing mode, to control an oscillator 42 of sawtooth waves so that the inclinations of such sawtooth waves will depend on the output of switching circuit 41 determined, in turn, by the selected reproducing mode. It will be appreciated that, when the stop-motion reproducing mode is selected, the resulting sawtooth wave from oscillator 42 is effective, as applied through mixer 31 to the control input of VCO 27, to cause the clock frequency to change in the manner shown on FIG. 4E. On the other hand, when the quick-motion reproducing mode is selected, the sawtooth wave then produced by oscillator 42 is effective, as applied to VCO 27, to cause the clock frequency from the latter to vary as shown on FIG. 6E.

The DC voltage generating circuit 29 is shown to include a detecting circuit 43 which, in the slow-motion reproducing mode, is adapted to detect the ratio 1/n of the relatively slow tape speed in respect to the standard tape speed for recording. As shown, by way of example, the detector 43 may receive, by way of amplifiers 43a and 43b, a rotary head position indicating signal conventionally provided by a pulse generator $P_G$ associated with the shaft of motor 5, and a tape position signal provided by a stationary head CTL which reproduces the control signals recorded in track $T_c$ on tape 6. The DC voltage generating circuit 29 is further shown to include a stepped-wave generating circuit 44 which, in dependence on the output of detecting circuit 43, generates a signal having its DC level varying stepwise for each successive field, and having a repetition period of n frames (or n fields), as shown on FIG. 10B. The DC voltage generating circuit 29 is completed by a switching circuit 45 which is operated in dependence on the selected reproducing mode so as to deliver a stepped output when the slow-motion reproducing mode is selected, whereas suitable DC outputs are delivered when the still-motion or quick-motion reproducing mode is selected.

It will be appreciated that, when the slow-motion reproducing mode is selected, the resulting stepped output from generating and switching circuits 44 and 45 is effective, as applied through mixer 31 to voltage controlled oscillator 27, to cause the step-wise changing of the frequency of the clock signal from oscillator 27, as shown on FIG. 10B. On the other hand, when the still-motion or quick-motion reproducing mode is selected, the resulting DC output provided from switching circuit 45 through mixer 31 to VCO 27 ensures that the lowest clock frequency from the latter will be higher than a predetermined value, for example, so as to ensure that the minimum delay effected by the CCDs 25 and 26 will be 2H, as previously described with reference to FIGS. 4D, 5C, 6D and 7C. If desired, the switching circuits 41 and 45 will be made responsive to the output of amplifier 43b so as to be changed-over for the slow-motion, quick-motion or still-motion reproducing mode in response to the rate at which the control signals on the tape 6 are reproduced by head CTL.

The rectangular wave generating circuit 30 is shown to be triggered by the pulse signal from pulse generator PG which, in the case where disc 2 is rotated at the frame frequency, has a repetition period equal to the frame period of the recorded video signal. Thus, generating circuit 30 is made to produce a rectangular waveform having a period equal to the frame period and during which alternately high and low values are provided for the two fields. Such rectangular waveform is effected as a control signal in oscillator 27 to cause CCDs 25 and 26 to impart a phase difference of 0.5H to the horizontal synchronizing signals in the fields which are next adjacent each other, in point of time, in the delayed video signal. A switch 46 is interposed between the output of generating circuit 30 and mixer 31 and is adapted to be closed for applying the rectangular wave signal from generating circuit 30 to VCO 27 only when it is desired to obtain interlacing of the odd- and even-numbered fields.

The phase error detecting circuit 32 receives horizontal synchronizing signals separated by a circuit 47 from the demodulated luminance signal after being delayed by CCD 26 and low-pass filter 38. Detecting circuit 32 further receives simulated or synthesized signals from an automatic frequency control circuit 48 which is triggered by the horizontal synchronizing signals from synch separating circuit 47 to deliver simulated horizontal synchronizing signals of stable frequency to circuit 32. Thus, phase error detecting circuit 32 compares the phases of the actual separated horizontal synchronizing signals and the simulated horizontal synchronizing signals and, in response to deviation therebetween, delivers an error signal through mixer 31 to VCO 27 for controlling the latter in the sense tending to eliminate the phase deviation. The simulated horizontal synchronizing signals from ACF 48 are also applied to a switcher or substituting circuit 49 actuable by vertical synchronizing signals, which may be suitably separated from the reproduced video signal, and the switcher 49 has its output connected through a switch 50 with mixer 36. When switch 50 is closed, switcher or substituting circuit 49 is made operative by the vertical synchronizing signals to substitute the simulated horizontal synchronizing signals from AFC 48 for the actual horizontal synchronizing signals contained in a predetermined portion of each field, for example, between the times $t_1$ and $t'_1$ on FIGS. 5B and 7B.

Finally, it will be noted that, in the apparatus according to the present invention as shown on FIG. 11, the outputs of sawtooth wave generator 28 and DC voltage generator 29 are also applied to a bi-morph drive circuit 51 so as to be effective in the latter to provide a drive signal to the bi-morph leaf 12 supporting each of the head chips 11a and 11b, and by which each head chip is made to accurately scan a record track when the slow-motion, quick-motion or still-motion reproducing mode is selected.

It will be apparent from the above that, in the magnetic recording and reproducing apparatus according to this invention as illustrated on FIG. 11, a video signal is recorded by at least one rotary head or head chip 11a, 11b in successive parallel tracks $T_a$, $T_b$ on a record medium in the form of a tape 6 while the latter is being driven at a standard speed $V_0$ in a direction relative to which the tracks are skewed, and the recorded video signal is reproduced by the rotary head or head chip 11a or 11b repeatedly scanning the recording medium while the latter is selectively driven at the standard speed for the normal reproducing mode, or at an arbitrary speed other than the standard speed, for example, at zero speed for the still-motion reproducing mode, or at speeds less than or greater than the standard speed for the slow-motion or quick-motion reproducing modes, respectively. Moreover, during reproducing with the recording medium being driven at an arbitrary speed other than the standard speed $V_0$, the reproduced video signal is delayed by variable delay means constituted by CCD 25 and CCD 26, with the amounts by which the reproduced video signal is thus delayed being controlled in accordance with the arbitrary tpae speed so as to cause fields of the reproduced video signal which are contiguous or next adjacent in point of time to be continuous in the delayed video signal and to contain respective horizontal synchronizing signals which are in predetermined phase relationship to each other, that is, either precisely in phase or out of phase by 0.5H, as when even- and odd-numbered fields are to be interlaced.

In the apparatus in accordance with this invention as shown in FIG. 11, the drive circuit 51 for applying a drive signal to each bi-morph leaf 12, so that the respective head chip 11a or 11b will move in a scanning path which coincides accurately with a record track on the tape 6 or other recording medium, is made responsive to the outputs of generating circuits 28 and 29 by which the delay of the reproduced video signal is controlled when the reproducing operation is being carried out with an arbitrary tape speed different from the standard tape speed for recording.

It will be appreciated that, in the slow-motion reproducing mode, the stepped delay controlling signal from generating circuit 44, which has a period of n frames, causes the variable delay elements or CCDs 25 and 26 to vary the time axis of the reproduced video signal in such a manner tha, where the arbitrary tape speed is 1/n (n being an integer) times the standard tape speed for recording, the amounts by which successive fields of the reproduced video signal are delayed are varied in a stepwise manner, and the amount of delay is returned to the original value at the conclusion of n frames.

The apparatus according to this invention is still further characterized by the application of a rectangular wave from generating circuit 30 to the control inlet of VCO 27 so that the output frequency of the latter will cause the CCDs 25 and 26, in delaying the successive fields of the reproduced video signal, to provide a phase difference of 0.5H between the odd- and even-numbered fields, whereby such fields are interlaced in the resulting image on a display device.

Finally, in the apparatus according to this invention, as shown on FIG. 11, horizontal synchronizing signals in a predetermined portion of each delayed field, for example, between the times $t_1$ and $t'_1$ in FIG. 5B, may be replaced by simulated horizontal synchronizing signals from AFC 48.

Having described a specific embodiment of this invention with reference to the drawings, it is to be understood that the invention is not limited to that precise embodiment, and that various changes and modifications may be effected therein by one skilled in the art without departing from the scope or spirit of the invention as defined in the appended claims.

What is claimed is:

1. In a recording and reproducing apparatus in which video signal is recorded by at least one rotary head in successive parallel tracks on a recording medium while the latter is being driven at a predetermined speed in a direction to which said tracks extend at a predetermined angle, and in which the recorded video signal can be reproduced by said rotary head repeatedly scanning the recording medium while the latter is selectively driven at an arbitrary speed which is 1/n times said predetermined speed with n being an integer; the combination of variable delay means operative during reproducing at said arbitrary speed for variably delaying the video signal reproduced by said rotary head; and control means for controlling the amounts by which said variable delay means delay the reproduced video signal in accordance with said arbitrary speed to cause fields of the reproduced video signal which are contiguous in point of time to be continuous in the delayed video signal and to contain respective horizontal synchronizing signals which are in predetermined phase relationships to each other, said control means including means detecting the ratio 1/n, means responsive to the detected ratio 1/n to provide a delay control signal which varies stepwise for successive fields of the video signal over a period of the latter comprised of n frames thereof with said delay control signal being repeated each said period of n frames, and means responsive to said delay control signal to cause said amounts of delay means to correspondingly vary stepwise for successive fields over said period of n frames for correcting the time base of the reproduced video signal.

2. In a recording and reproducing apparatus in which a video signal is recorded by at least one rotary head in successive parallel tracks on a recording medium while the latter is being driven at a predetermined speed in a direction to which said tracks extend at a predetermined angle, and in which the recorded video signal can be reproduced by said rotary head repeatedly scanning the recording medium while the latter is selectively driven at an arbitrary speed ranging from zero speed to at least said predetermined speed; the combination of variable delay means operative during reproducing when said arbitrary speed is other than said predetermined speed for variably delaying the video signal reproduced by said rotary head, control means for controlling the amounts by which said variable delay means delay the reproduced video signal in accordance with said arbitrary speed to cause fields of the reproduced video signal which are contiguous in point of time to be continuous in the delayed video signal and to contain respective horizontal synchronizing signals which are in predetermined phase relationships to each other, and means for generating a simulated horizontal synchronizing signal including an automatic frequency control circuit and separating means for separating the horizontal synchronizing signal from the delayed video signal and applying the same to said automatic frequency control circuit, and means for replacing the horizontal synchronizing signal of the delayed video signal with said simulated horizontal synchronizing signal in a predetermined portion of the reproduced video signal as delayed by said delay means.

3. In a recording and reproducing apparatus in which a video signal is recorded by at least one rotary head in successive parallel tracks on a recording medium while the latter is being driven at a predetermined speed in a direction to which said tracks extend at a predetermined angle, and in which the recorded video signal can be reproduced by said rotary head repeatedly scanning the recording medium while the latter is driven at a selected arbitrary speed ranging from zero speed to at least said predetermined speed; the combination of an electro-mechanical transducer supporting said rotary head and being effective, in response to an electrical drive signal, to displace said rotary head in directions generally transverse to the direction along said tracks, drive circuit means for providing said drive signal so as to compensate for deviations of the scanning path of said rotary head from said tracks resulting from said arbitrary speed during reproducing being selected as other than said predetermined speed, variable delay means operative during reproducing when said arbitrary speed is selected as other than said predetermined speed for variably delaying the video signal reproduced by said rotary head, and control means responsive to the selected arbitrary speed other than said predetermined speed for controlling the amounts by which said variable delay means delay the reproduced video signal in accordance with said selected arbitrary speed to cause fields of the reproduced video signal which are contiguous in point of time to be continuous in the delayed video signal and to contain respective horizontal synchronizing signals which are in predetermined phase relationships to each other.

4. A recording and reproducing apparatus according to claim 3; in which said electro-mechanical transducer is constituted by a bi-morph leaf which flexes to displace said rotary head upon the application of said drive signal to said leaf.

5. A recording and reproducing apparatus according to claim 3; in which said control means includes means operative, when interlacing is desired in respect to paired fields which are next adjacent each other in point of time, to provide a delay control signal having a rectangular wave component alternating between relatively high and low levels during said paired fields, respectively, and by which said variable delay means causes said predetermined phase relationships of the horizontal synchronizing signals in said contiguous fields to be one-half horizontal period phase difference.

6. A recording and reproducing apparatus according to claim 3; further comprising means for generating a simulated horizontal synchronizing signal, and means for replacing the horizontal synchronizing signal of the delayed video signal with said simulated horizontal synchronizing signal in a predetermined portion of the reproduced video signal as delayed by said delay means.

7. A recording and reproducing apparatus according to claim 6; in which said predetermined portion of the reproduced video signal in which the horizontal synchronizing signal of the delayed video signal is replaced by said simulated horizontal synchronizing signal is constituted by a concluding portion of each field of the delayed video signal.

8. In a recording and reproducing apparatus in which a video signal is recorded by at least one rotary head in successive parallel tracks on a recording medium while the latter is being driven at a predetermined speed in a direction to which said tracks extend at a predetermined angle, and in which the recorded video signal can be reproduced by said rotary head repeatedly scanning the recording medium while the latter is selectively driven at an arbitrary speed ranging from zero speed to at least said predetermined speed; the combination of variable delay means including at least one charge transfer device and being operative during reproducing when said arbitrary speed is other than said predetermined speed for variably delaying the video signal reproduced by said rotary head, and control means including variable oscillator means providing a delay control signal in the form of a clock signal of a frequency determining the delay of the reproduced video signal by said charge transfer device in accordance with said arbitrary speed to cause fields of the reproduced video signal which are contiguous in point of time to be continuous in the delayed video signal and to contain respective horizontal synchronizing signals which are in predetermined phase relationships to each other.

9. A recording and reproducing apparatus according to claim 8; in which said recorded video signal is a color video signal including a luminance component which is frequency modulated for recording and a chrominance component which is frequency converted for recording to a band under that of the frequency modulated luminance component; and further comprising means for separating the luminance and chrominance components from the reproduced video signal, demodulating means for demodulating the frequency modulated luminance component separated from the reproduced video signal and applying the demodulated luminance component to said one charge transfer device, and another charge transfer device included in said variable delay means and acting on the chrominance component separated from the reproduced video signal.

10. A recording and reproducing apparatus according to claim 9; further comprising frequency converting means operating on the delayed chrominance component from said other charge transfer device for reconverting said chrominance component to a standard carrier frequency.

11. A recording and reproducing apparatus according to claim 8; in which said variable oscillator means is a voltage controlled oscillator; and in which said control means further includes sawtooth wave generating means for applying to said voltage controlled oscillator, as a control voltage for the latter; a sawtooth wave signal, and selectively operable means for controlling the inclination and amplitude of said sawtooth wave signal.

12. A recording and reproducing apparatus according to claim 11; in which said control means further includes means for detecting a ratio 1/n of said arbitrary speed relative to said predetermined speed with n being an integer, and selectively operable means responsive to the detected ratio 1/n for applying to said voltage controlled oscillator, as a control voltage for the latter, a stepped signal which varies stepwise for successive fields of the video signal over a period of the latter comprised of n frames and which is repeated each said period of n frames.

13. A recording and reproducing apparatus according to claim 12; in which said control means further includes selectively operable means for applying a rectangular wave signal to said voltage controlled oscillator as a control voltage for the latter, said rectangular wave signal alternating between relatively high and low levels during paired fields of the video signal which are next adjacent each other in point of time, the difference between said high and low levels being effective in said voltage controlled oscillator to cause said charge transfer device to vary the delaying of the reproduced video signal by one-half horizontal period of the latter.

14. A recording and reproducing apparatus according to claim 12; further comprising an electromechanical transducer supporting said rotary head and being effective, in response to an electrical drive signal, to displace said rotary head in directions generally transverse to the direction along said tracks, and drive circuit means receiving said sawtooth wave signal and said stepped signal so as to determine said drive signal therefrom and thereby compensate for deviations of said scanning path from said tracks.

* * * * *